(12) United States Patent
Korolchuk (10) Patent No.: US 7,419,694 B2
(45) Date of Patent: Sep. 2, 2008

(54) PROCESS FOR PRODUCING AN ULTRAFINE-MILLED WHOLE-GRAIN WHEAT FLOUR AND PRODUCTS THEREOF

(75) Inventor: Theodore Korolchuk, Papillion, NE (US)

(73) Assignee: ConAgra Foods Food Ingredients Company, Inc., Omaha, NE (US)

( * ) Notice: Subject to any disclaimer, the term of this patent is extended or adjusted under 35 U.S.C. 154(b) by 0 days.

(21) Appl. No.: 10/738,732

(22) Filed: Dec. 17, 2003

(65) Prior Publication Data

US 2005/0136173 A1   Jun. 23, 2005

(51) Int. Cl.
*A23L 1/10* (2006.01)
*A23L 1/172* (2006.01)

(52) U.S. Cl. .................. 426/622; 426/462; 426/464; 426/469; 426/518

(58) Field of Classification Search .............. 426/622, 426/463, 464, 469, 518
See application file for complete search history.

(56) References Cited

U.S. PATENT DOCUMENTS

| | | | | |
|---|---|---|---|---|
| 2,230,417 | A | | 2/1941 | Wellinghoff ............... 426/622 |
| 2,895,831 | A | | 7/1959 | Tewfic ....................... 426/436 |
| 3,100,708 | A | * | 8/1963 | Emerson, Jr. ................ 426/62 |
| 4,017,034 | A | * | 4/1977 | Griffith et al. ................ 241/74 |
| 4,919,952 | A | | 4/1990 | Sadaranganey et al. |
| 4,956,190 | A | * | 9/1990 | Chawan et al. .............. 426/269 |
| 5,114,079 | A | | 5/1992 | Curran |
| 5,192,028 | A | | 3/1993 | Curran |
| 6,372,281 | B1 | | 4/2002 | Metzger et al. |
| 6,495,191 | B1 | | 12/2002 | Maldonado |
| 6,569,483 | B2 | | 5/2003 | Zohoungbogbo |
| 6,613,372 | B1 | | 9/2003 | Schlebusch et al. |
| 2003/0104103 | A1 | | 6/2003 | Monsalve-Gonzalez |
| 2005/0255219 | A1 | | 11/2005 | Dreese et al. ............... 426/622 |

FOREIGN PATENT DOCUMENTS

CA        2141974        8/1995

OTHER PUBLICATIONS

U.S. Appl. No. 08/194,672, filed Feb. 14, 1994, Michael J. Wolt, et al.
U.S. Appl. No. 08/583,246, filed Jan. 5, 1996, Michael J. Wolt, et al.
"Unifine Flour, Milling, Baking and Consumer Acceptance Tests," by George E. Pease, et al., Washington State Institute of Technology, Bulletin No. 206, Apr. 1950; 44 pages.
McBride, J., Back to the Old Grind-er, Argicultural Research, May 2000, p. 21.
Atwell, W. A., An Overview of Wheat Development, Cultivation, and Production, Cereal Foods World, Feb. 2001, vol. 46, No. 2, pp. 59-62.
Gap Mill GMD, Bauermeister, Inc., 2 pages.
Marquart, L., et al., Whole Grains and Health Past, Present, and Future, aib Technical Bulletin, Feb. 2003, vol. XXV, Issue 2, pp. 1-14.
Erhard-Hudson, J., Unifine flour from Azure Standard/Azure Farms, Sep. 2001, www.moscowfoodcoop.com/archive/azure.html, 3 pages.

* cited by examiner

*Primary Examiner*—Helen F Pratt
(74) *Attorney, Agent, or Firm*—Merchant & Gould P.A.

(57) ABSTRACT

A process for producing an ultrafine-milled whole-grain wheat flour which has the full nutritional value of wheat kernels, while retaining the texture of refined wheat flour and an appearance similar to refined wheat flour, and the products which can be made from the ultrafine-milled whole-grain wheat flour. The process can be used for producing an ultrafine-milled coarse fraction. Further, using the process with a variety of other grains is discussed.

17 Claims, 8 Drawing Sheets

NUTRITIONAL COMPARISION OF REFINED WHEAT FLOUR AND WHOLE-GRAIN WHEAT FLOUR
(USDA National Nutrient Database for Standard Reference, Release 15 (8/2002)

|  | Refined Wheat Flour | Whole Wheat Flour |
|---|---|---|
|  | 12% Moisture Basis | |
| % Protein* | 10.33% | 13.70% |
| % Fat* | 0.98% | 1.87% |
| % Minerals* | 0.50% | 1.60% |
| % Total Carbohydrates* | 76.31% | 72.57% |
| % Total Dietary Fiber* | 2.70% | 12.20% |

Fig. 3

Traditional Mill Process Flow Diagram

| Wheat Variety = Platte | Particle Size Alpine Air Jet On US 100 Wire | Particle Size Alpine Air Jet On US 200 Wire | Particle Size Alpine Air Jet On US 325 Wire | Particle Size Alpine Air Jet On US 400 Wire |
|---|---|---|---|---|
| Fine Fraction (Refined wheat flour) Step 1 of 2-step process | 1.4 | 47.0 | 77.2 | 98.0 |
| Ultrafine-Milled Coarse Fraction Step 2 of 2-step process | 4.0 | 46.2 | 67.6 | 99.8 |
| Ultrafine-Milled Whole-Grain Wheat Flour (Blend of Fine Fraction and Ultrafine-Milled Coarse Fraction) | 2.0 | 48.0 | 78.4 | 98.4 |

FIG. 8

NUTRITIONAL COMPARISION OF REFINED WHEAT FLOUR, ULTRAFINE-MILLED WHOLE-GRAIN WHEAT FLOUR AND ULTRAFINE COARSE FRACTION

| | Refined Wheat Flour[1] | Ultrafine-Milled Whole-Grain Wheat Flour[1] | Ultrafine-Milled Coarse Fraction[2] |
|---|---|---|---|
| | | 12% Moisture Basis | |
| % Protein | 10.33% | 13.70% | 18.40% |
| % Fat | 0.98% | 1.87% | 6.10% |
| % Minerals | 0.50% | 1.60% | 5.80% |
| % Total Carbohydrates | 76.31% | 72.57% | 57.70% |
| % Total Dietary Fiber | 2.70% | 12.20% | 38.60% |

[1] USDA National Nutrient Database for standard reference, Release 15 (8/2002)
[2] ConAgra Foods data, CF1071503 hard red winter

PROCESS FOR PRODUCING AN ULTRAFINE-MILLED WHOLE-GRAIN WHEAT FLOUR AND PRODUCTS THEREOF

FIELD OF INVENTION

The present invention relates to a process for producing an ultrafine-milled whole-grain wheat flour and the products thereof. The process includes using the entire wheat kernel in order to manufacture an ultrafine-milled whole-grain wheat flour and products thereof.

BACKGROUND OF INVENTION

Refined wheat flour (white flour) is used to produce a wide range of popular bakery and snack products, including breads, muffins, waffles, pizza crusts, cookies, crackers, and ready to eat cereals, which traditionally have a uniform, light-colored appearance and smooth (non-gritty) texture. Comparatively, products made with traditional whole-grain wheat flour, tend to have a coarser, dense texture and a darker, less consistent appearance. The wheat kernel consists of three fractions, the endosperm, bran, and germ, which are compositionally and morphologically very different. Refined wheat flour is formed primarily from the endosperm of the wheat kernel along with small amounts of bran and germ. The endosperm comprises approximately 82% of the wheat kernel. The function of the endosperm is to provide energy for the embryonic plant during germination of the wheat kernel. The endosperm contains approximately 75% starch and 10-14% protein. Compared to the bran and germ, the endosperm contains low amounts of fiber, lipid, vitamins, minerals, pigments and other phytonutrients. This helps give the refined wheat flour its consistent, fine, starchy texture and off-white color compared to whole-grain wheat flour. While refined wheat flour offers the texture and color consumers desire, it does not have the nutritional value of whole-grain wheat flour. Many consumers, particularly children, prefer the texture, appearance and flavor of bakery and snack products made with refined wheat flour compared to products made from whole-grain wheat flour. It is estimated that only 0.8-1 of the 6.7 servings of grain-based foods that adult Americans (20 years or older) consume per day is whole-grain. The importance of increasing whole-grain consumption is reflected in the changes in recommendations set forth by government and health organization expert groups. In the Healthy People 2010 Report (National Academy Press, 1999), it is recommended that individuals two years and older should consume at least six daily servings of grain products with at least three being whole grains. In the 2000 Dietary Guidelines for Americans (Fifth Edition, USDA, USDHHS, Home and Garden Bulletin No. 232), a separate recommendation was added for grains, specifically, that individuals should choose a variety of grains daily, especially whole grains. The American Heart Association also makes specific recommendations regarding whole grains related to increasing intake of dietary fiber.

Figure 1:
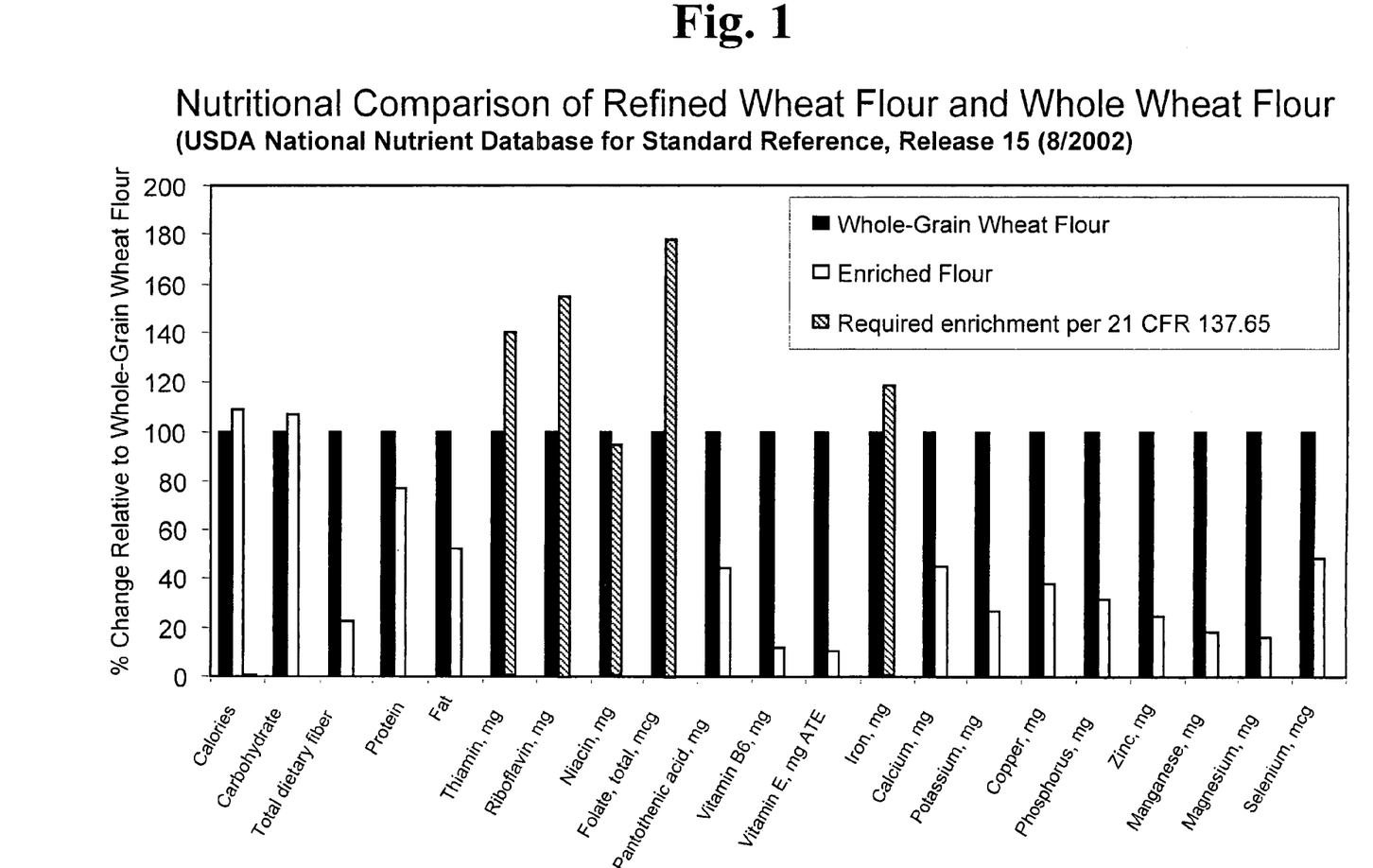
FIG. 1 is a bar graph nutritional comparison of refined wheat flour and whole-grain wheat flour.
Figure 2:
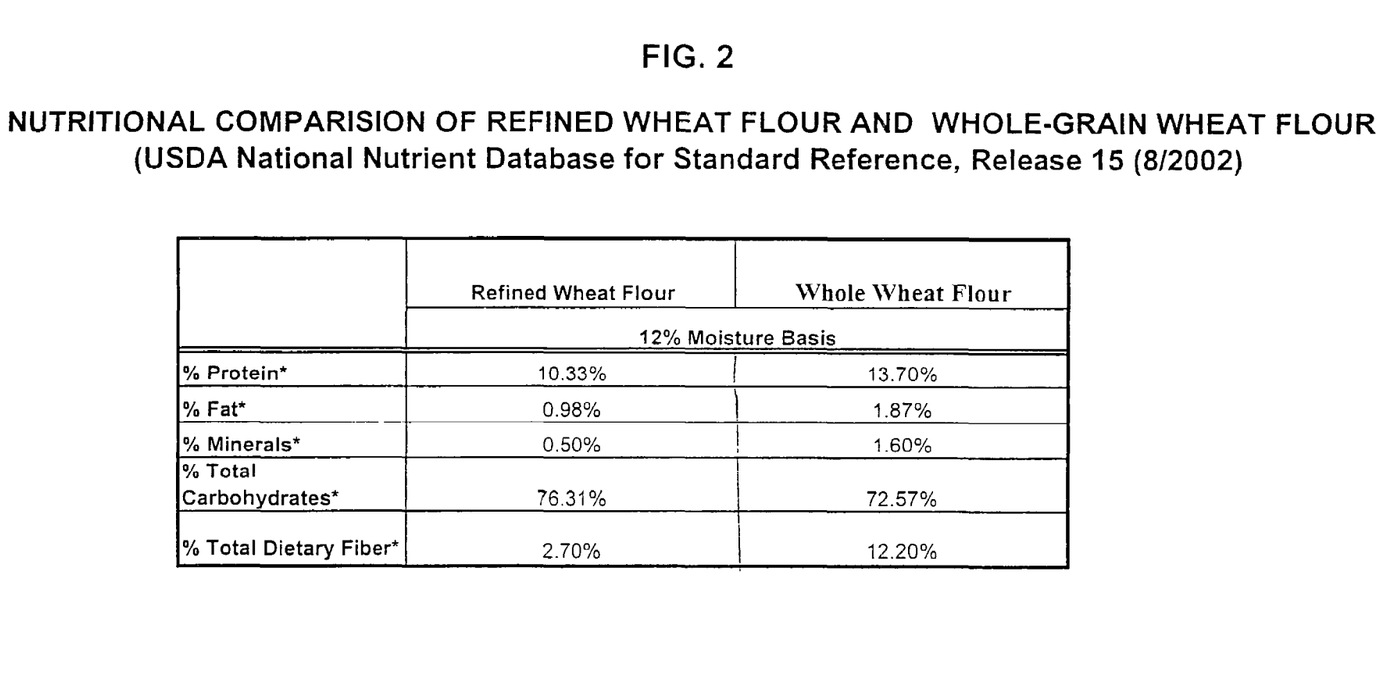
FIG. 2 is a table comparing the nutritional content of refined wheat flour and whole-grain wheat flour, the amount of total carbohydrates is determined by a proximate analysis, the percentage of protein, fat, ash, and moisture is determined and subtracted from 100, the result is considered the percentage of total carbohydrates, however, the percentage of total dietary fiber is an actual measurement.

Whole-grain wheat flour has increased nutritional value compared to refined wheat flour because it includes the entire wheat kernel, including the bran, germ and endosperm, rather than primarily just the endosperm, FIGS. 1 & 2. Thus, whole-grain wheat flour is higher in fiber, protein, vitamins, minerals, lipids and phytonutrients, including phenolic compounds and phytates, which function as dietary antioxidants, along with other nutrients, when compared to refined wheat flour. The use of whole-grain wheat flour in products typically made with refined wheat flour changes the texture and color of the products. Since consumers typically prefer the consistent texture and lighter color of products using refined wheat flour, these effects on product texture and appearance limit the use of traditional whole-grain wheat flour in bakery and snack products. When whole-grain wheat flour is used in bakery and snack products in place of the refined wheat flour, the products typically contain visible bran specks, have a coarser, heavier texture, and a darker color when compared to products made with the refined wheat flour. The differences in texture and color, along with the bran specks within the product makes the product less desirable to most consumers. It has been found that in many instances the increased nutritional value of the products using the whole-grain wheat flour does not overcome the consumers desire to have a consistent texture, light colored product which does not include bran specks. Based on the nutritional value of whole-grain wheat flour versus refined wheat flour, including the fact that the whole-grain wheat flour contains more fiber, protein and other nutrients and less starch, it would be preferred to use whole-grain wheat flour in a variety of prepared products for consumer consumption.

Compared to whole-grain wheat flour, refined wheat flour is higher in calories and starch, while containing only about a fifth of the dietary fiber found in whole-grain wheat flour and about 20% less protein than whole-grain wheat flour, as shown in FIGS. 1 & 2. Recently, health practitioners have been promoting the benefits of less processed, whole-grain foods. In particular, it is suggested that people should consume lesser amounts of processed foods containing high amount of starches and sugars in order to have a healthier overall diet. Refined wheat flour contains high amounts of starch. Further, although enriched refined wheat flour contains thiamin, riboflavin, niacin, folic acid and iron added at or slightly above the levels found in the wheat kernel, it does not include fiber, minerals, lipids, and phytonutrients found in whole-grain wheat flour. The fiber, minerals, lipids and phytonutrients that refined wheat flour does include, are generally present in lesser amounts than that found in whole-grain wheat flour, and their presence is largely due to small amounts of bran and germ that are present in refined wheat flour, FIG. 1.

Currently in the United States, consumption of white bread made from refined wheat flour versus whole wheat bread is about 5 to 1. For every five loaves of white bread consumed, one loaf of whole wheat bread is consumed. Given that popular bakery and snack products made with refined wheat flour are low in fiber and do not have the nutritional benefits of their respective whole-grain counterparts, it is important to develop a whole-grain wheat flour that can be used to replace refined wheat flour in bakery and snack products, yet yield products with a desirable texture and appearance that is acceptable to consumers. The development of such bakery and snack products would increase the fiber intake of most of the population. Populations which rely on high fiber diets typically have less heart disease, less hypertension, lower rates of colon cancer, less diabetes, and less obesity. Typically in the United States, individuals consume 12-15 grams of fiber per day, which is half or less of the recommended level. The development of food products which are high in fiber without sacrificing the look and feel of refined wheat flour is desirable.

Three sets of terms are typically used to define wheat of the species *Triticum aestivum* (common wheat). The first is hard or soft, which relates to the hardness of the kernel. The second is red or white, which relates to the presence or absence of a red pigment in the outer layers of the wheat kernel. Finally, there are winter or spring wheat varieties that are categorized as such depending on when the wheat is planted. Durum wheat is of the species *Triticum durum*. Durum wheat is distinctly different from common wheat in that it produces very hard kernels and has yellow pigments throughout the endosperm rather than in the outer layers. It is typically used to produce pasta products, while common wheat is used, for example, in breads, cakes, cookies, and crackers.

Refined wheat flour is that flour prepared by grinding and bolting cleaned wheat other than durum wheat and red durum wheat. The Food and Drug Administration (FDA) requires flour to meet certain particle size standards in order to be included in the category of refined wheat flour. That particle size is described as flour in which not less than 98% passes through a cloth having openings not larger than those of woven wire cloth designated "212 µm (U.S. Wire 70)". According to the FDA Code of Federal Regulations (CFR), enriched flour is refined wheat flour which contains 2.9 mg of thiamin, 1.8 mg of riboflavin, 24 mg of niacin, 0.7 mg of folic acid and 20 mg of iron per pound of refined wheat flour. Enriched flour may also contain calcium in the amount of 960 mg per pound of refined wheat flour. In order to meet U.S. FDA guidelines, enriched flour may not contain more than 5% by weight of wheat germ or partly defatted wheat germ.

FDA guidelines for whole wheat flour state that it is prepared by grinding cleaned wheat, other than durum wheat and red durum wheat, which once ground has a particle size wherein not less than 90% passes through a 2.36 millimeter (U.S. Wire 8) sieve and not less than 50% passes through an 850 µm (U.S. Wire 20) sieve. In whole wheat flour (whole-grain wheat flour), the proportions of the natural constituents in the wheat other than moisture remain unaltered as compared to the wheat kernels. The entire wheat kernel is used. Products are considered to be 100% whole wheat when the dough is made from whole wheat flour, bromated whole wheat flour, or a combination of these. No refined wheat flour, or enriched flour is used in these products. Whole-grain wheat flour is considered healthier than enriched refined flour because it contains the entire spectrum of nutrients that are naturally present in the wheat kernel, FIGS. 1 & 2.

Traditionally, whole wheat products are not as finely milled as refined wheat products. In order to produce ultrafine whole wheat flour using a traditional milling flowsheet, further processing of the coarse fraction is required. A multiple pass hammermilling system that would include an intermediate method for sifting the ground product is required to reduce the coarse fraction to a particle size equivalent to that of refined wheat flour. The current technology, which would use hammermills to reduce the coarse fraction for production of ultrafine whole wheat flour, has a low capacity and a high energy usage per ton of product.

Attempts have been made to produce ultrafine whole wheat products, however, these attempts generally were not economically feasible and generally not accepted by the industry. The processes relied on reducing millfeed (coarse fraction) particle size using traditional grinding methods such as rollermills, hammermills, and bran slicers, which cannot economically or efficiently reduce the coarse fraction particles to the ultrafine granulation required. The process is currently uneconomical due to the high amount of energy usage and capitalization which is required to grind the coarse fraction using the rollermills, hammermills and bran slicers. Hammermills, rollermills and bran slicers reduce the particle size of the bran and germ, coarse fraction, by using shear and impact as the primary mode of reduction rather than the more efficient method of particle on particle attrition. This is an inefficient way to grind these portions of the wheat kernel.

A typical whole-grain wheat flourmill does not produce whole-grain wheat flour with a particle size comparable to refined wheat flour. Using current technology, the finest granulation of whole-grain wheat flour that is available in the marketplace has a particle size of only 60% through a U.S. Wire 100 sieve. Thus, the whole-grain wheat flour is generally coarse and unattractive to consumers, and therefore less functional for the baker. A mill flowsheet is a map of the milling process. The traditional whole wheat mill flowsheet is only capable of producing a few types of granular whole-grain flour products, FIG. 3. As such, traditional whole-grain wheat milling technology is not able to achieve adequate particle size reduction to produce whole-grain wheat flour that has similar baking attributes to refined wheat flour.

What is needed is a way to increase the nutritional value of popular bakery and snack products by utilizing whole-grain wheat flour, while retaining the baking attributes and the "look and feel" of a typical refined wheat flour, thereby producing more palatable whole-grain wheat products for consumers. The process should produce an ultrafine-milled whole-grain wheat flour using the entire wheat kernel, that will allow food product developers to use a higher percentage of whole-grain wheat flour in their bakery and snack products in order to improve the finished product's nutritional value. The process should yield an ultrafine-milled whole-grain wheat flour which includes the entire wheat kernel. Thus, the ultrafine-milled whole-grain wheat flour will contain all the nutrients found in the wheat kernel. The ultrafine-milled whole-grain wheat flour should be able to replace refined wheat flour in traditional bakery and snack products, such as breads, muffins, waffles, pizza crusts, cookies, crackers, and ready to eat cereals in order to improve the nutritional value of the products that contain the flour. The texture of the bakery products and snack products made with the ultrafine-milled whole-grain wheat flour should be the same as if refined wheat flour was used. The appearance of such bakery and snack products will be similar to products made with refined wheat flour.

SUMMARY OF INVENTION

The present invention relates to a process for manufacturing ultrafine-milled whole-grain wheat flour and the products thereof. Ultrafine is defined as having a particle size of less than or equal to about 150 µm. The process is a continuous flow grain milling process, including the steps of separating a quantity of cleaned and tempered wheat kernels into a fine fraction comprised primarily of endosperm along with small amounts of residual bran and germ and a coarse fraction comprised of bran, germ, and a small amount of residual endosperm. The coarse fraction is ground through a mill, such as a gap mill, to form an ultrafine-milled coarse fraction having a particle size of less than or equal to about 150 µm. Finally, the ultrafine-milled coarse fraction is mixed with the fine fraction in order to form the ultrafine-milled whole-grain wheat flour. The advantage of this is that the flour has the full nutritional value of wheat kernels, while retaining the texture of refined wheat flour and an appearance similar to refined wheat flour. Thus, the flour can be used in food products such as bakery products and snack food products, which typically use refined wheat flour.

Further, the current invention discloses a three-in-one process for making refined wheat flour, an ultrafine-milled coarse fraction, and an ultrafine-milled whole-grain wheat flour. This three-in-one process also includes ultrafine-milling the entire wheat kernel. The first product of the three in one process is refined wheat flour. This refined wheat flour is identical to the refined wheat flour currently on the market. The second product is the ultrafine-milled coarse fraction of the current invention. Finally, the third product, the ultrafine-milled whole-grain wheat flour is made by mixing the ultrafine-milled coarse fraction with the fine fraction. The three-in-one process can be used with any type of grain which can be milled.

In addition, a process for fortifying a refined wheat flour is also disclosed, which includes mixing an amount of refined wheat flour with an amount of the ultrafine-milled coarse fraction having a particle size distribution less than or equal to about 150 μm. By mixing the refined wheat flour with the ultrafine-milled coarse fraction, an ultrafine-milled wheat flour product is produced, which contains more nutrients than refined wheat flour and could be used to replace all of the refined wheat flour in muffins, waffles, pizza crust, bagels, pastas, cookies, crackers and ready to eat cereal. In breads, a percentage of the refined wheat flour could be replaced by the ultrafine-milled wheat flour product. The present invention also includes the product of the process, bakery products made from the product of the process, and snack products made from the product of the process.

The process yields a refined wheat flour, an ultrafine-milled coarse fraction which can be used to replace a percentage of refined flour or whole wheat flour, and an ultrafine-milled whole-grain wheat flour which has the nutritional composition of whole wheat flour while retaining the texture of refined wheat flour and an appearance similar to refined wheat flour. The ultrafine-milled whole-grain wheat flour can be used for any application that uses refined wheat flour.

DETAILED DESCRIPTION

The present invention relates to a process of producing an ultrafine-milled whole-grain wheat flour and the products thereof. The preferred process is a continuous flow grain milling process, whereby the process begins by providing or obtaining a quantity of wheat. The wheat is milled to produce a fine fraction formed primarily of endosperm and a coarse fraction formed primarily of bran and germ. The two fractions are milled to produce fractions having particle sizes less than or equal to about 150 μm. In particular, an ultrafine-milled coarse fraction is made that does not have visible bran specks and has a particle size of less than or equal to about 150 μm. The two fractions are combined to form an ultrafine-milled whole-grain wheat flour. It is preferred if a gap mill is used to mill the coarse fraction during processing.

For milling purposes, the wheat kernel is divided into three general anatomical regions. The bran is made up of the outer protective layers, which comprise about fourteen percent (14%) of the kernel by weight and is high in fiber and ash (mineral) content. The germ layer is the embryonic wheat plant and comprises about three percent (2-3%) of the wheat kernel. The germ layer contains a high percentage of the lipids and essential nutrients found in the wheat kernel. The endosperm is the starchy inner portion of the wheat kernel that provides the energy for the developing wheat plant. The endosperm is characterized by its high starch and moderately high protein (i.e., gluten) content. The majority of the wheat kernel is comprised of the endosperm. The endosperm is the primary constituent in refined wheat flour.

Wheat milling is a mechanical method of breaking open the wheat kernel to separate as much endosperm as possible from the bran and germ and to grind the endosperm into flour. The process substantially separates the major components of wheat from one another. Refined wheat flour is produced when most of the bran and germ are separated from the endosperm. Typically, the yield of the endosperm, or refined wheat flour from the milling process, is between seventy to eighty percent (70-80%) of the total wheat processed. The remaining endosperm is still present in the coarse fraction. The typical yield of the current invention is between about 97% to about 100% of the entire wheat kernel, dependent on moisture loss due to processing.

After obtaining a quantity of wheat, the kernels are cleaned, and tempered. The tempered wheat is then held for a period of approximately 8 to 24 hours to allow the moisture to equilibrate within the wheat kernels. The tempered wheat is then processed through a series of rollermills, sifters and purifiers in order to separate the endosperm from the bran and germ. Once separated from the bran and the germ, the endosperm is ground to a particle size of less than or equal to about 150 μm. The bran and germ are removed and collected as part of the coarse fraction. The coarse fraction is comprised of bran, germ, and a small amount of residual endosperm.

Figure 3:
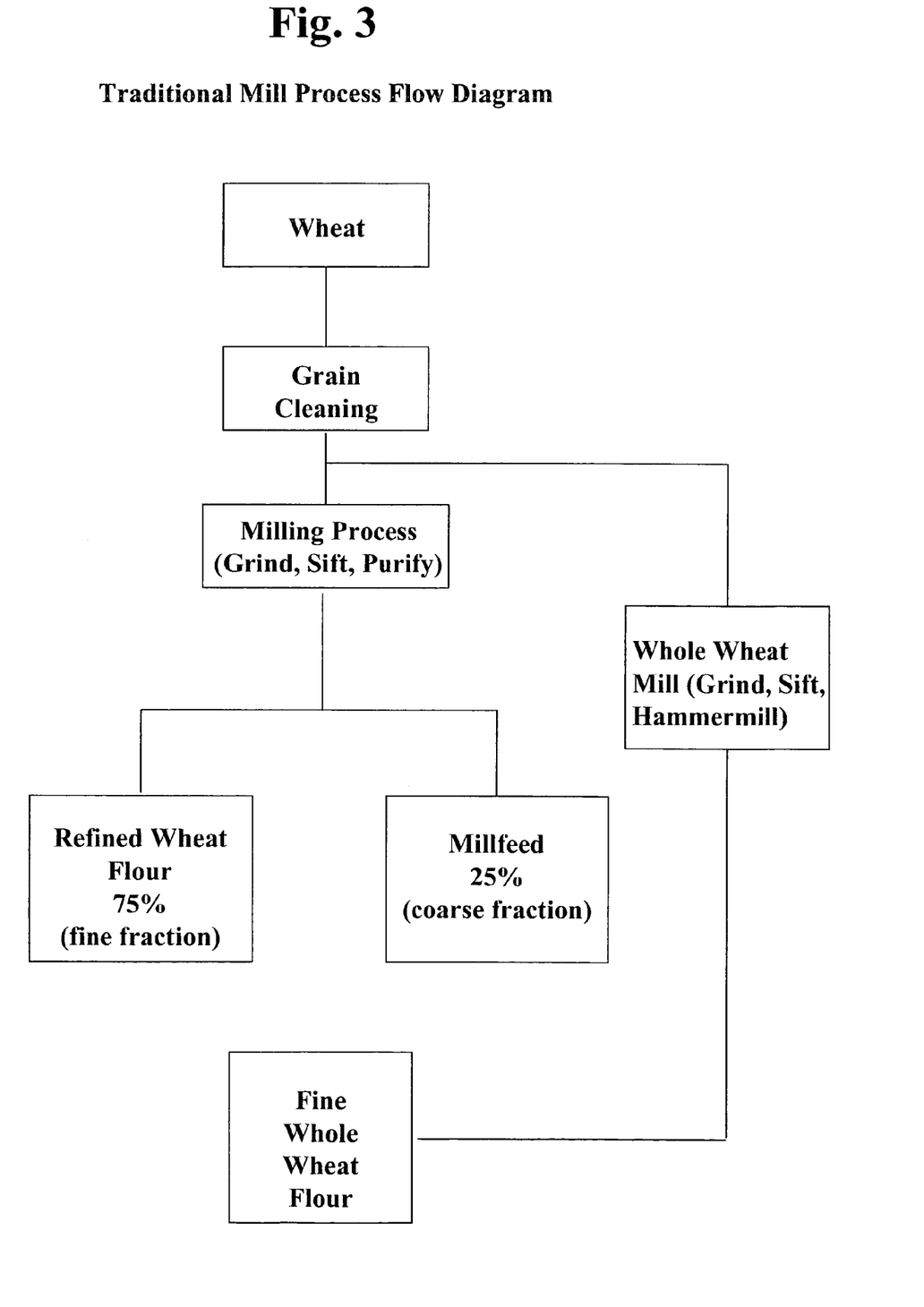
FIG. 3 is a flow chart of a traditional refined wheat flour milling process and a traditional whole wheat milling process.

In traditional milling methods the wheat is gathered, cleaned and tempered and then ground in order to form refined wheat flour and millfeed (coarse fraction), as shown in FIG. 3. The first step in this process, cleaning the wheat, includes removing various impurities such as weed seeds, stones, mud-balls, and metal parts, from the wheat. The cleaning of the wheat typically begins by using a separator in which vibrating screens are used to removes bits of wood and straw and anything else that is too big or too small to be wheat. Next, an aspirator is used, which relies on air currents to remove dust and lighter impurities. Then a destoner is used to separate the heavy contaminants such as stones that are the same size as wheat. Air is drawn though a bed of wheat on an oscillating deck that is covered with a woven wire cloth. A separation is made based on the difference in specific gravity and surface friction. The wheat then passes through a series of disc or cylinder separators which separate based on shape and length, rejecting contaminates that are longer, shorter, rounder or more angular than a typical wheat kernel. Finally, a scourer removes a portion of the bran layer, crease dirt, and other smaller impurities.

Once the wheat is cleaned, it is tempered in order to be conditioned for milling. Moisture is added to the wheat kernel in order to toughen the bran layers while mellowing the endosperm. Thus, the parts of the wheat kernel are easier to separate and tend to separate more easily. Prior to milling, the tempered wheat is stored for a period of eight to twenty-four hours to allow the moisture to fully absorb into the wheat kernel. The milling process is basically a gradual reduction of the wheat kernels. The grinding process produces a mixture of granulites containing bran and endosperm, which is sized by using sifters and purifiers. The coarse particles of endosperm are then ground into flour by a series of roller-mills. When milling wheat, the wheat kernel typically yields 75% refined wheat flour (fine fraction) and 25% coarse fraction. The coarse fraction is that portion of the wheat kernel which is not processed into refined wheat flour, typically including the bran, germ, and small amounts of residual endosperm.

Figure 4:
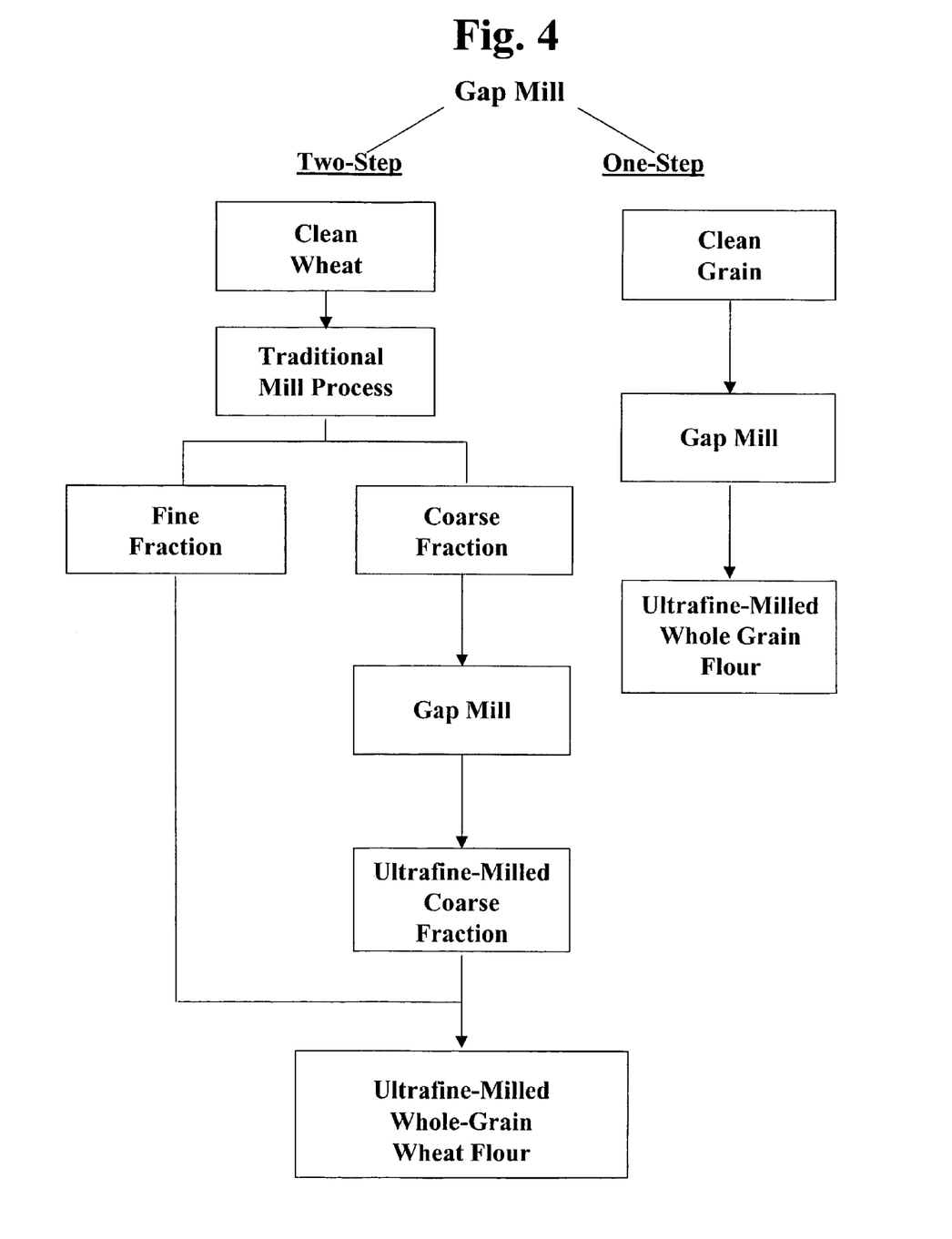
FIG. 4 is a flow chart of the gap milling process of the current invention, illustrating the one-step and two-step processes.

The recovered coarse fraction is then ground through a grinder, preferably a gap mill, to form an ultrafine-milled coarse fraction having a particle size distribution less than or equal to about 150 μm, FIG. 4. The gap mill tip speed normally operates between 115 m/s to 130 m/s. Additionally, after sifting, any ground coarse fraction having a particle size greater than 150 μm can be returned to the process for further milling.

Figure 6:
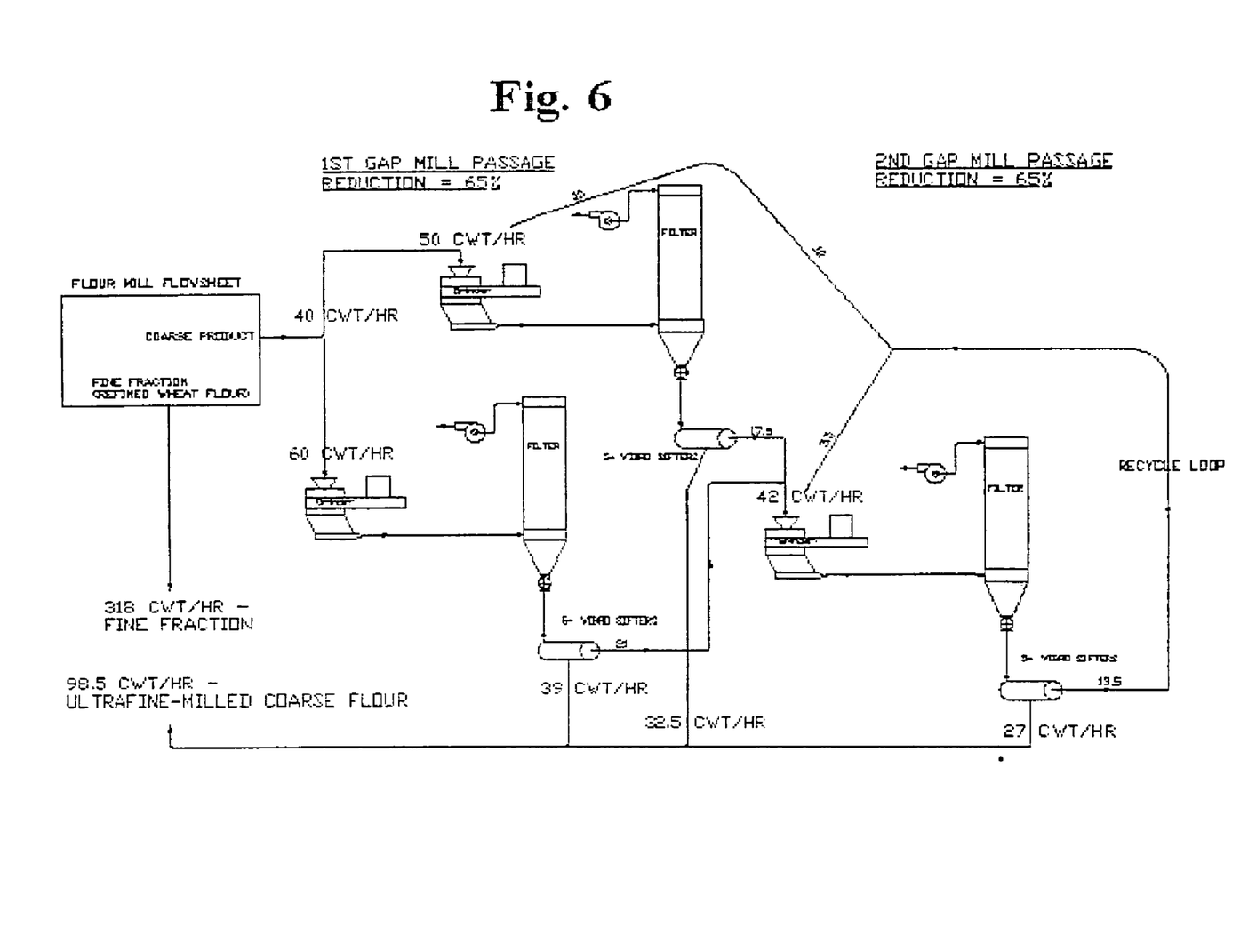
FIG. 6 is a detailed flowsheet of the high capacity gap mill process, illustrating the two passage gap mills including the recycling process of the current invention.

The high capacity process begins as shown in the flowsheet set forth in FIG. 6. After the fine fraction (refined wheat flour) and the coarse fraction (coarse product) have been separated, the coarse fraction is divided and each portion of the coarse fraction is sent through a separate grinder. The coarse fraction is divided and sent to two different gap mills in order to increase the capacity of the system. The grinder is preferably a gap mill. The use of a gap mill is preferred to other types of mills because the design of the gap mill allows the particles of the coarse fraction to collide with each other, particle on particle attrition, thereby further breaking the particles down into smaller particle sizes. The gap mill is preferably a Bauermeister Gap Mill (Bauermeister, Inc., Memphis, Tenn.). The Bauermeister gap mill is the most efficient because it is designed for fine grinding and includes an adjustable grinding gap between a conical shaped rotor and a corrugated baffle. This results in a higher level of particle reduction as compared to other gap mills. The coarse fraction is continuously conveyed from the flourmill to the inlet of the two first passage gap mills at an approximate rate of 10,000 pounds per hour (#/hr). The ground coarse fraction is then discharged out of the bottom of the gap mill by gravity, into an airflow and pneumatically conveyed to a filter.

The ground coarse fraction exits the gap mill by means of a 5000 cfm (approximate airflow) negative pressure lift. The ground coarse fraction is separated from the air stream by a filter, which discharges into a Vibro Sifter. The Vibro Sifter separates the ground coarse fraction by using centrifugal and vibratory force to sift the ground coarse fraction. The material passing through the screen is the ultrafine-milled coarse fraction having a particle size of less than or equal to about 150 μm and thus requires no further processing. The ground coarse fraction passing over the screen has too large of a particle size and requires additional particle reduction. This ground coarse fraction flows to the second passage gap mill. Once it is passed through the second passage gap mill, the ground coarse fraction is conveyed by means of a 5000 cfm (approximate airflow) negative pressure lift. The ground coarse fraction is separated from the air stream by a filter, which discharges into a Vibro Sifter. The ground coarse fraction is sifted using a Vibro Sifter to ensure a particle size of less than or equal to about 150 μm in the finished product, the ultrafine-milled coarse fraction. The ground coarse fraction passing over the Vibro Sifter screen has too large of a particle size and requires additional particle reduction. This portion of the ground coarse fraction is directed back to the inlets of the $1^{st}$ passage and $2^{nd}$ passage gap mills for further processing.

Figure 8:
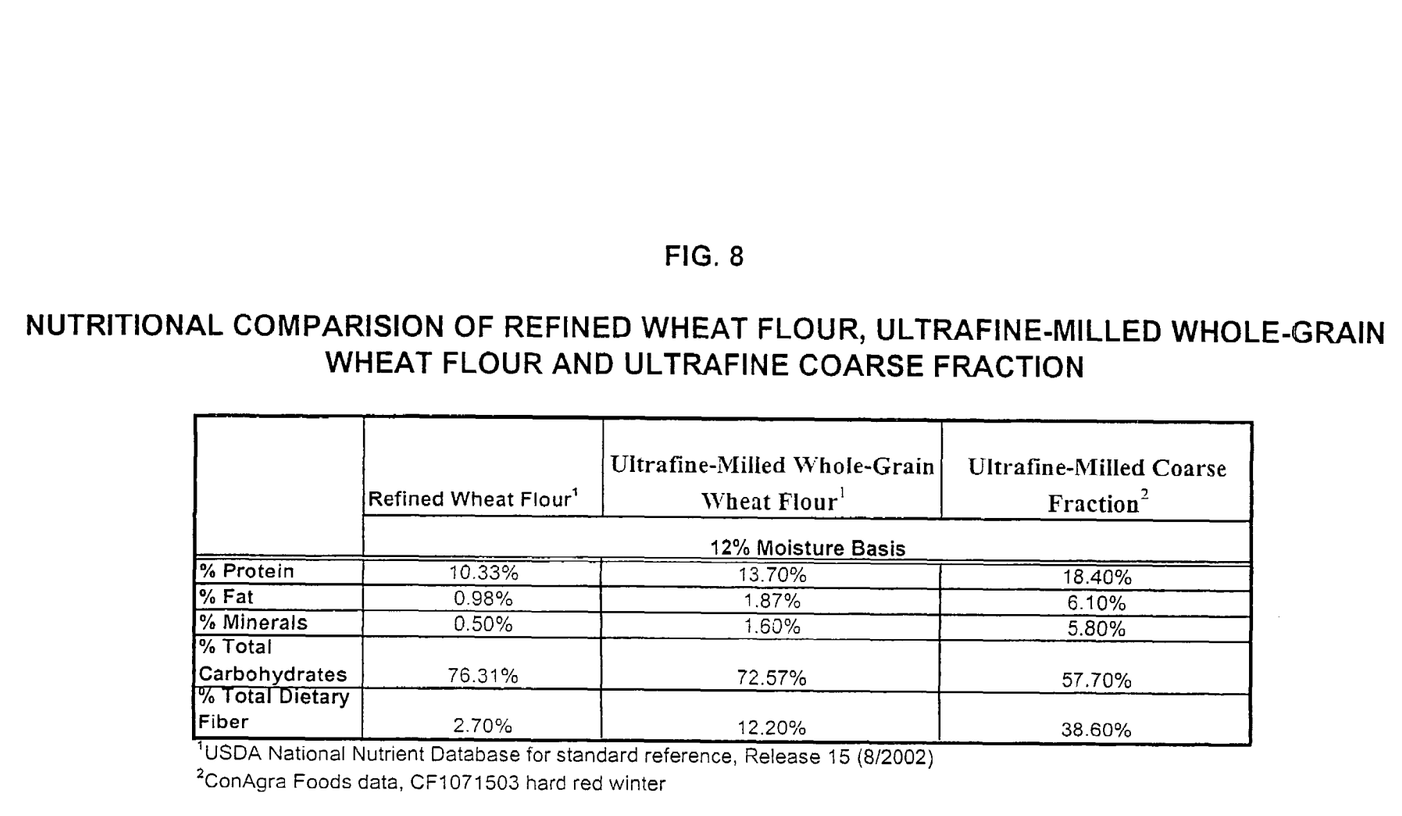

The ultrafine-milled coarse fraction is then mixed with the fine fraction to form the ultrafine-milled whole-grain wheat flour. The ultrafine-milled whole-grain wheat flour has the nutritive value of the wheat kernel while retaining the texture of refined wheat flour and an appearance similar to refined wheat flour, FIG. 8. Thus, the flour can be used in place of refined wheat flour in most bakery products and snack food products. The use of the ultrafine-milled whole-grain wheat flour in bakery products and snack food products increases the amount of fiber and other nutrients in these products making the products healthier for consumers.

The process can yield up to three separate products. The first product is refined wheat flour, comprised of the fine fraction, which contains the endosperm of the wheat kernel. This fraction typically has a particle size distribution of less than or equal to about 150 μm. According to FDA standards, the refined wheat flour product must have a particle size in which not less than 98% passes through a U.S. Wire 70 sieve. Thus, in order to meet FDA standards, the particle size distribution must be less than or equal 212 μm for refined wheat flour. The refined wheat flour is typically comprised of about 10% protein, about 1% fat, about 76% total carbohydrates, which includes about 3% dietary fiber, and about 0.5% ash (minerals), FIG. 8.

The second product is the ultrafine-milled coarse fraction. This is the coarse fraction which has been processed through the gap mill and has a particle size distribution less than or equal to about 150 μm. This ultrafine-milled coarse fraction contains about 20% protein, about 7% fat, about 60% total carbohydrates, including about 40% dietary fiber. The ash (mineral) content of the ultrafine-milled coarse fraction is about 6%, FIG. 8. The ultrafine-milled coarse fraction can be used to make a variety of food products, including high fiber breads, cereals and snack products. Further, the ultrafine-milled coarse fraction can be sold to consumers and used to replace a percentage of refined flour or whole wheat flour that are currently on the market.

The third product is an ultrafine-milled whole-grain wheat flour. This flour has a particle size distribution of less or equal to about 150 μm. Due to the particle size distribution and the nutritional value of the ultrafine-milled whole-grain wheat flour, it can replace whole wheat flour or refined wheat flour in any food products currently made with these flours. The nutritional composition of this ultrafine-milled whole-grain wheat flour is identical to that of whole wheat flour, FIG. 8. The ultrafine-milled whole-grain wheat flour contains about 14% protein, about 2% fat, about 2% ash (minerals), and about 73% total carbohydrates, including about 12% total dietary fiber. Thus, the ultrafine-milled whole-grain wheat flour as compared to the ultrafine-milled coarse fraction contains less protein, fiber and minerals, FIG. 8. This is expected since the ultrafine-milled whole grain wheat flour is comprised of the fine fraction, which is the refined wheat flour, mixed with the ultrafine-milled coarse fraction. Since the fine fraction and the ultrafine-milled coarse fraction are combined to form the ultrafine-milled whole-grain wheat flour after each fraction has been milled to a particle size distribution of less than or equal to about 150 μm, the ultrafine-milled whole-grain wheat flour is considered to be a pre-mixed wheat flour composition when the two fractions first contact each other, prior to the fractions being blended. Once the two fractions contact each other, the fractions are blended to form the ultrafine-milled whole-grain wheat flour. The ultrafine-milled whole-grain wheat flour has a texture identical to refined wheat flour and a color similar to refined wheat flour. Therefore, the ultrafine-milled whole-grain wheat flour can be used in any food product which currently includes refined wheat flour. A major benefit of the ultrafine-milled whole-grain wheat flour is that the texture and appearance of the refined wheat flour is retained while the nutritional value of the whole wheat flour is added.

Another embodiment is a process for fortifying refined wheat flour. The process includes mixing an amount of refined wheat flour with an amount of ultrafine-milled coarse fraction having a particle size distribution less than or equal to about 150 µm to produce an ultrafine-milled wheat flour product. The ultrafine-milled wheat flour product contains more nutrients than refined wheat flour and can be used for any food products which currently use refined wheat flour or whole wheat flour such as muffins, waffles, pizza crust, bagels, pastas, cookies, crackers and ready to eat cereal.

In a further embodiment, other grain products, such as corn, rye, barley, rice, oats, triticale, sorghum, millet, buckwheat, quinoa, amaranth, variants thereof, and mixtures thereof can be ground using the same process but at varying grinding capacities. Use of the process to grind these other grains yields ultrafine-milled whole grain flours made from about 100% of the grain. These ultrafine-milled grain flours can be used in the same applications as whole-grain flours, which are currently on the market. Therefore, the ultrafine grain flours can be used in breads, cereals, and snack products. The ultrafine-milled whole grain flours could also be marketed directly to consumers for use in their homemade baked products.

EXAMPLES

Example 1

A quantity of Platte hard white winter wheat was obtained and milled according to known milling procedures. The fine fraction and the coarse fraction are separated during the milling process. The fine fraction has a particle size of 1.4% coarser than a US 100 Wire (mesh size 149 µm), FIG. 7 (ref. 1270). Therefore, 98.6% of the fine fraction has a particle size distribution of less than or equal to 150 µm. Further sifting was done using a U.S. 200 Wire (74 µm), a U.S. 325 Wire (44 µm) and a U.S. 400 Wire (37 µm). Forty-seven percent of the fine fraction was left on the U.S. 200 Wire, indicating that 53% of the fine fraction has a particle size distribution of less than or equal to 74 µm. About 77% of the fine fraction was left on a U.S. 325 Wire, indicating that 23% of the fine fraction had a particle size distribution of less than or equal to 44 µm. Finally, 98% of the fine fraction was left on a U.S. 400 Wire, indicating that 2% of the fine fraction had a particle size of less than or equal to 37 µm.

Figure 5:
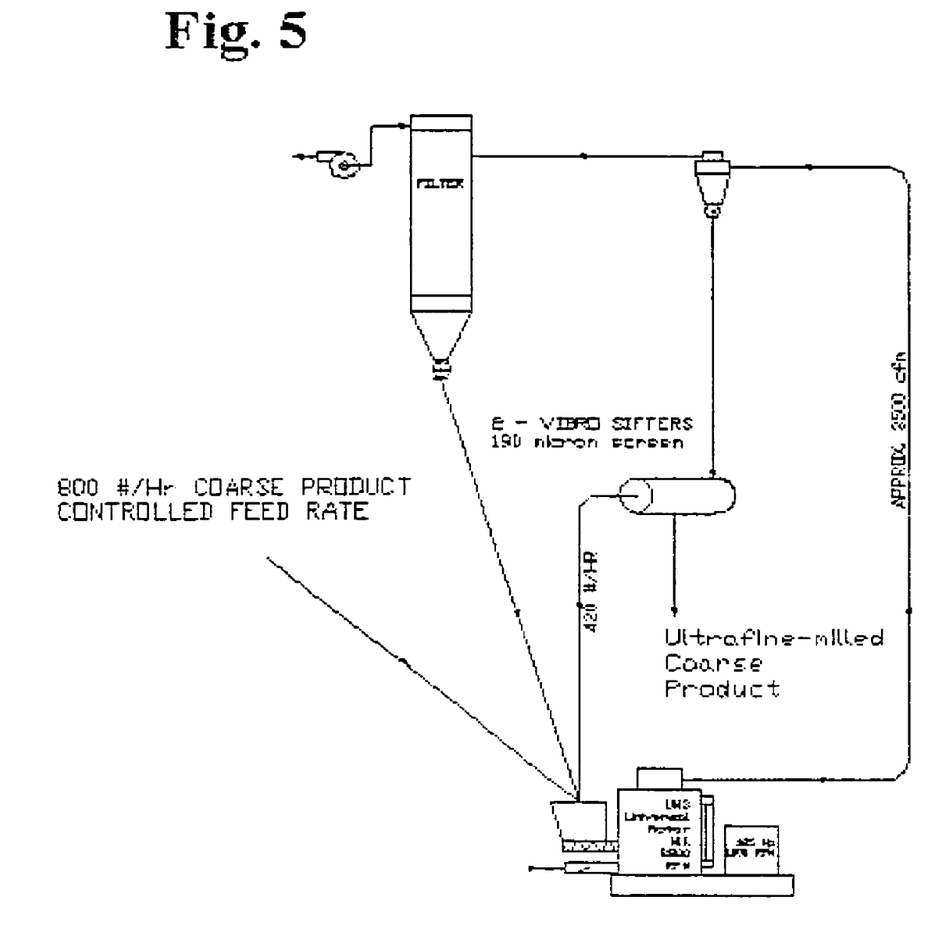
FIG. 5 is a detailed flowsheet of the gap mill process.

The coarse fraction was ground using a UMS Type FG1 Gap Mill, FIG. 5. After passing through the Gap Mill, 4.0% of the ultrafine-milled coarse fraction did not pass through a U.S. 100 Wire (mesh size 149 µm), as shown in reference 1269 of FIG. 7. Therefore, 96% of the ultrafine-milled coarse fraction has a particle size of less than or equal to 150 µm. About 46% of the ultrafine-milled coarse fraction was left on the U.S. 200 Wire, indicating that 54% of the ultrafine-milled coarse fraction has a particle size distribution of less than or equal to 75 µm. About 68% of the ultrafine-milled coarse fraction was left on the U.S. 325 Wire, indicating that 32% of the ultrafine-milled coarse fraction had a particle size distribution of less than or equal to 44 µm. Finally, about 99% of the ultrafine-milled coarse fraction was left on the U.S. 400 Wire, indicating that 1% of the ultrafine-milled coarse fraction had a particle size distribution of less than or equal to 37 µm, FIG. 7.

Figure 7:
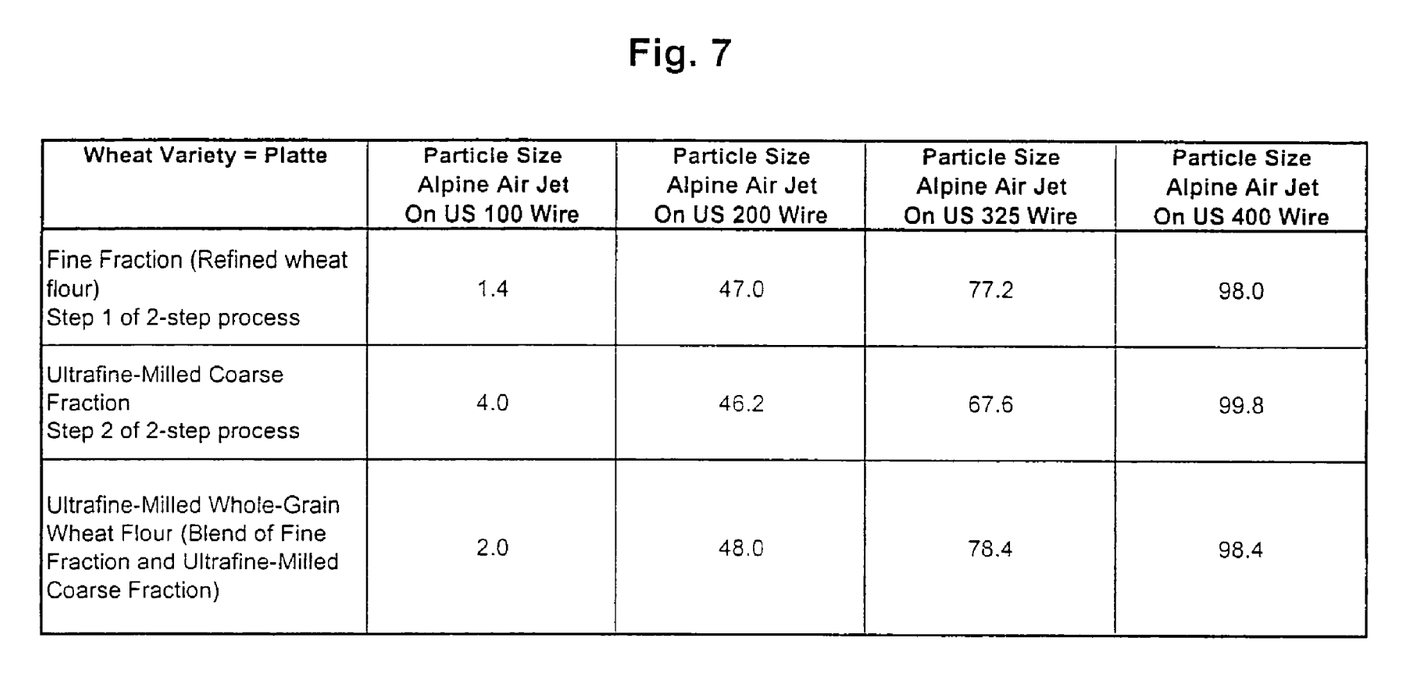
FIG. 7 is a table listing the particle size distributions for a fine fraction (refined wheat flour), an ultrafine-milled coarse fraction, and an ultrafine-milled whole-grain wheat flour; and, FIG. 8 is a table listing the nutritional data of refined wheat flour, versus ultrafine-milled whole grain wheat flour and ultrafine-milled coarse fraction.

After blending the ultrafine-milled coarse fraction with the fine fraction, to form ultrafine-milled whole grain wheat flour, 2% of the ultrafine-milled whole grain wheat flour did not pass through a US 100 Wire (mesh size 149 µm), as shown in reference 1301 of FIG. 7. Therefore, about 98% of the fine fraction has a particle size distribution of less than or equal to 150 µm. Further sifting was done using a U.S. 200 Wire (74 µm), a U.S. 325 Wire (44 µm) and a U.S. 400 Wire (37 µm). Forty-eight percent of the fine fraction was left on the U.S. 200 Wire, indicating that 52% of the fine fraction has a particle size distribution of less than or equal to 74 µm. About 78% of the fine fraction was left on a U.S. 325 Wire, indicating that 22% of the fine fraction had a particle size distribution of less than or equal to 44 µm. Finally, 98% of the fine fraction was left on a U.S. 400 Wire, indicating that 2% of the fine fraction had a particle size of less than or equal to 37 µm.

Thus, the results, as shown in FIG. 7, indicate that the use of the gap mill on the coarse fraction yielded a product that had a particle size similar to the refined wheat flour. Based on these results, an ultrafine-milled whole-grain wheat flour has been produced which uses the entire wheat kernel and has all of the nutritional value of whole wheat flour while retaining the particle size distribution requirements of refined wheat flour.

Example 2

High Capacity Installation to Produce Ultrafine-milled Whole-grain Wheat Flour:

A typical flour mill flowsheet produces refined wheat flour (the fine fraction) and the coarse fraction. The coarse fraction will be conveyed continuously from the flour mill to two gap mills, FIG. 6. A first gap mill passage will use two machines with an estimated throughput of 110 cwt/hr (11000 hundred weight per hour). The flowsheet, FIG. 6, will reduce 100 cwt/hr of coarse fraction to the desired particle size. The ground coarse fraction will be conveyed from the gap mill by means of a 5000 cfm negative pressure pneumatic lift to a filter, designed to separate the air from the conveyed product without the use of a cyclone. The ground coarse fraction will exit the filter and be discharged into a Vibro Sifter. The Vibro Sifter will separate the ground coarse fraction by using centrifugal and vibratory force to sift the ground coarse fraction. The material passing through the Vibro Sifter screen will be the ultrafine-milled coarse fraction having a particle size distribution of less than or equal to 150 µm and will require no further processing. The first passage gap mill efficiency will reach 65% extraction. The ground coarse fraction from the gap mill passage having a particle size greater than 150 µm will be separated by the Vibro Sifter and directed to the second single gap mill for further reduction. The ground coarse fraction from the gap mill passage having a particle size greater than 150 µm will be conveyed continuously from the first gap mill Vibro Sifter to the second gap mill passage at an estimated rate of 38.5 cwt/hr. Approximately 13.5 cwt/hr of the ground coarse fraction will have a particle size greater than 150 µm and will be rejected by the second passage Vibro Sifter. The 13.5 cwt/hr of the ground coarse fraction having a particle size greater than 150 μm will enter a recycle loop to be reground on the first and second gap mill passages. Both ground coarse fractions will follow the process flow previously described for the first and second gap mill passages. Fifteen percent of the rejected second passage ground coarse fraction will return to the second passage gap mill and 85% of the second passage ground coarse fraction will return to the first passage gap mill. The grinding efficiency for the second gap mill passage will be less than the first gap mill passage grinding. The grinding efficiency of the second pass gap mill should be approximately 50%+/−5% through a 150 μm screen. System capacity will be limited to the grinding efficiency of the second passage gap mill. Once reduced, the ultrafine-milled coarse fraction and the fine fraction will be continuously blended together to produce the ultrafine-milled whole-grain wheat flour. The flour has the same nutritional value as whole wheat flour and the texture and color similar to refined wheat flour, FIG. 5.

Example 3

High Capacity Installation to Produce an Ultrafine-milled Coarse Fraction:

The same procedure as disclosed in Hypothetical Example 1 will be followed, except the ultrafine-milled coarse fraction is the end product and will not be mixed with the fine fraction. The ultrafine-milled coarse fraction is higher in protein and fiber than either refined wheat flour or whole wheat flour, FIG. 5 while having a texture similar to refined wheat flour.

Example 4

Production of an Ultrafine-milled Whole Grain Product:

A wide variety of grain can be processed to produce ultrafine-milled whole grain products. The grain used can be any grain known in the art including corn, rye, barley, rice, oats, triticale, sorghum, millet, buckwheat, quinoa, amaranth, variants thereof, and mixtures thereof. The grain will be conveyed continuously to two gap mills, FIG. 6. A first gap mill passage with two machines will have an estimated throughput of 110 cwt/hr, but may vary due to the morphology and composition of the grain. The flowsheet, FIG. 6, will reduce 100 cwt/hr of grain to the desired particle size. The ground grain will be conveyed from the gap mill by means of a 5000 cfm negative pressure pneumatic lift to a filter, which is designed to separate the air from the ground grain without the use of a cyclone. The ground grain will exit the filter discharging into a Vibro Sifter. The Vibro Sifter will separate the ground grain by using centrifugal and vibratory force to sift the ground grain. The material passing through the screen is the ultrafine-milled grain product having a particle size distribution of less than or equal to 150 μm and will require no further processing. The first passage gap mill efficiency will reach about 79% extraction. The ground grain from the gap mill passage having a particle size greater than 150 μm will be separated by the Vibro Sifter and directed to the second single gap mill for further reduction. The ground grain having a particle size greater than 150 μm will be conveyed continuously from the first gap mill Vibro Sifter to the second gap mill passage at an estimated rate of about 24 cwt/hr. Approximately 12 cwt/hr of the ground grain is rejected by the second passage Vibro Sifter. The rejected ground grain will enter a recycle loop to be reground on the first and second gap mill passages. Both ground grain products will follow the process flow previously described for the first and second gap mill passages. Fifteen percent of the rejected second passage ground grain returns to the second passage gap mill and 85% of the rejected ground grain returns to the first passage gap mill. The grinding efficiency for the second gap mill passage will be less than the first gap mill passage grinding. The grinding efficiency of the second pass gap mill should be approximately 50%+/−5% through a 150 μm screen. System capacity will be limited to the grinding efficiency of the second passage gap mill. The ultrafine-milled whole grain flour will have the same nutritional value as the respective conventionally-milled whole-grain flour but with a finer texture.

Thus, there has been shown and described a method of making ultrafine-milled whole-grain flour and products thereof, which fulfills all the objects and advantages sought therefor. It is apparent to those skilled in the art, however, that many changes, variations, modifications, and other uses and applications to the method of making ultrafine-milled whole-grain wheat flour and products thereof are possible, and also such changes, variations, modifications, and other uses and applications which do not depart from the spirit and scope of the invention are deemed to be covered by the invention, which is limited only by the claims which follow.

REFERENCES

Marquart, Len, Gary Fulcher and Joanne Slavin, "Whole Grains and Health—Past, Present and Future," *Technical Bulletin*, Volume XXV, Issue 2, 2003

USDA/USDHHS. Healthy People 2010: Objectives for improving health. U.S. Department of Agriculture/U.S. Department of Health and Human Services, Office of Disease Prevention and Health Promotion. U.S. Government Printing Office, Washington, D.C. 2001. http://www.health.gov/healthypeople/.

Agricultural Research, "Back to the Old Grind-er," page 21, May 2000.

What is claimed is:

1. A continuous flow grain milling process for producing ultrafine-milled whole-grain wheat flour comprising the steps of:
   (a) offering a quantity of cleaned and tempered wheat kernels;
   (b) milling the wheat kernels into a fine fraction, consisting essentially of endosperm, and a coarse fraction comprising bran and germ;
   (c) separating the fine fraction and the coarse fraction;
   (d) separately milling the fine fraction to form a milled fine fraction;
   (e) separately milling the coarse fraction in a gap mill having a conical rotor to form a milled coarse fraction and
   (f) combining a portion of the milled coarse fraction with a portion of the milled fine fraction such that the combination has a particle size distribution where greater than 98% passes through a U.S. 70 wire screen and contains at least substantially all bran and germ as in the cleaned and tempered intact wheat kernels.

2. The process of claim 1, wherein the milled whole grain wheat flour has a particle size distribution in which not less than ninety-five percent (95%) passes through a U.S. wire 100 sieve.

3. A process for producing an edible product comprising:
   (a) obtaining a quantity of the ultrafine-milled whole grain wheat flour produced by the process of claim 1; and (b) mixing the obtained the ultrafine-milled whole grain wheat flour with additional ingredients to produce an edible product.

4. The process of claim 3, wherein the milled whole grain wheat flour has a particle size distribution in which not less than ninety-five percent (95%) passes through a U.S. wire 100 sieve, and wherein an air attrition gap mill having a conical rotor is used to grind the coarse fraction into an ultrafine-milled coarse fraction.

5. The process of claim 3, wherein the edible product is selected from the group consisting of food, snack, and bakery products.

6. The process of claim 3, wherein the wheat is a variety of white wheat.

7. The continuous flow grain milling process of claim 1, wherein the wheat kernels are a variety of white wheat.

8. The process of claim 1, wherein the milled whole grain wheat flour composition has substantially the same ash content as the cleaned and tempered wheat kernels.

9. The process of claim 1, wherein the wheat is a variety of durum wheat.

10. The process of claim 1, wherein the wheat is a variety of red wheat.

11. The process of claim 1, wherein the milled whole grain wheat flour contains a substantially higher ash percentage than the cleaned and tempered wheat kernels.

12. The process of claim 1, wherein the milled whole grain wheat flour contains at least substantially the same ash content as intact wheat kernels.

13. The process of claim 1 wherein the milled whole grain wheat flour has an ash content at least 95% of the ash content of intact wheat kernels.

14. The process of claim 1 wherein the ash content of the composition is at least 97% of the ash content of an intact wheat kernels.

15. The grain milling process of claim 1, wherein the gap mill is an air attrition gap mill.

16. The grain milling process of claim 1, wherein the gap mill is an air attrition gap mill having an adjustable grinding gap between the conical shaped rotor and a corrugated baffle.

17. The grain milling process of claim 1, wherein the coarse fraction is continuously fed to two first pass gap mills having an approximate throughput rate of 10,000 pounds per hour.

* * * * *